Sept. 16, 1930.  A. HOFMANN  1,776,000
SAFETY MECHANISM FOR CLUTCH OPERATORS
Filed Dec. 22, 1926
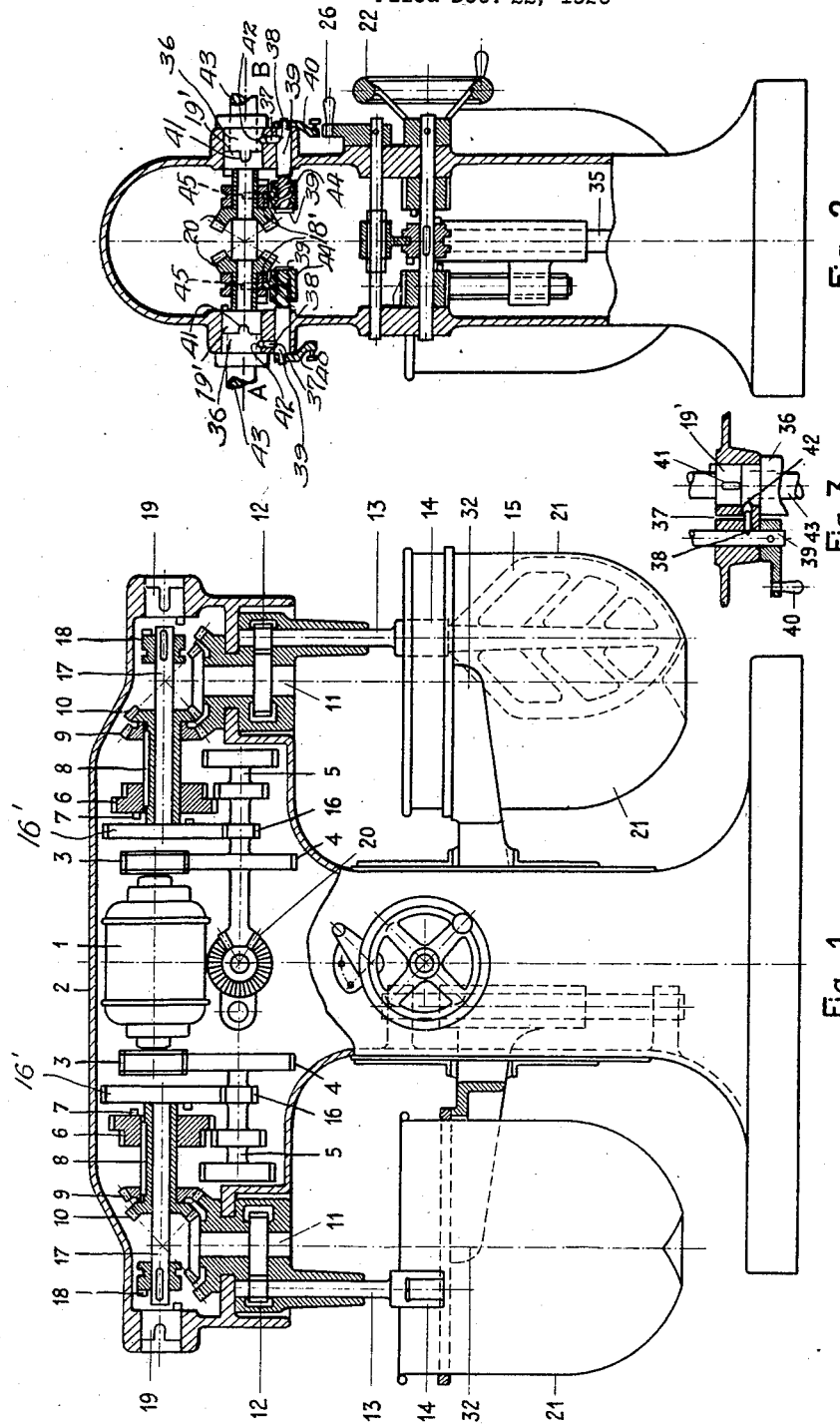
INVENTOR:
Albert Hofmann
BY Ruegg, Bayne & Bakeler
ATTORNEYS.

Patented Sept. 16, 1930

1,776,000

UNITED STATES PATENT OFFICE

ALBERT HOFMANN, OF ZURICH-ENGE, SWITZERLAND

SAFETY MECHANISM FOR CLUTCH OPERATORS

Application filed December 22, 1926, Serial No. 156,282, and in Switzerland December 30, 1925.

This invention relates to a combined machine for mixing, stirring and beating material in large quantities or in small quantities for use in kitchen and confectionery, said machine having connection-points for connecting auxiliary machines. The invention consists essentially in that automatic clutches and safety devices are arranged for driving the auxiliary machines connected with the main machines, so that said auxiliary machines can be connected with the corresponding gearing only when the clutch is disengaged.

An embodiment of the invention is shown, by way of example, in the accompanying drawings, in which:

Fig. 1 shows the machine in side elevation, partly in longitudinal section.

Fig. 2 is a cross section, partly in elevation.

Fig. 3 is a section in elevation through the casing at one end showing a clearer view of the safety device.

In the housing 2 of the machine the driving motor, for instance an electric motor 1, is accommodated, which has one pinion 3 for every counter wheel 4 of each counter shaft 5, said counter shafts driving change-wheels 6 fitted each with one clutch element 7. The change wheels 6 are shiftably mounted on sleeves 8, said sleeves being mounted on shafts 17. The shafts 17 are capable of rotation in the sleeves 8 and they are driven from the counter shafts 5 by pairs of spur wheels 16, 16′, the spur wheel 16′ being mounted on shaft 17 and carrying the second half of the clutch, with which the change wheel 6 which carries the first half clutch element can be brought into engagement. The change wheels 6 are adapted to be shifted on the sleeves 8 carried by the shafts 17, by means of hand levers, which are not shown, in such a manner that three different speeds can be produced. The rotation of the change wheels 6 is transmitted through the intermediary of bevel wheels 9 and 10 upon a vertical shaft 11 and a corresponding planet gear, the circulating wheels 12 of which are keyed upon vertical shafts 13, which carry on their free end 14 the exchangeable mixing-stirring and beating tools 15.

From the shafts 17 working elements 19 can be driven by shifting of clutches 18, said elements 19 being designed for connecting auxiliary machine elements, belt pulleys, and the like. The clutches 18 can be engaged and disengaged with the aid of hand levers or the like, arranged on the outer side of the machine housing, and not shown on the drawing.

The above described mechanism is arranged one on each side of the driving motor 1.

In the form of construction shown, one of the two counter shafts 5 drives two bevel wheels 20 of two other driving elements 19′ (Fig. 2), which are adapted to be engaged or disengaged, in the manner described, each by a lockable clutch 18′, with the aid of an adjustable hand lever arranged on the outer side of the machine housing 2, so that, in the form of construction shown, all four auxiliary driving elements 19, 19′ can be rotated.

The clutches 18, 18′ have safety- or locking-arrangements, designed to prevent the connecting of the auxiliary apparatus, unless the clutches are disengaged (Fig. 3). The auxiliary apparatus, which are not shown, comprise each an insertion piece 36, through which the driven shaft 43 of the auxiliary apparatus projects, said shaft carrying a tappet 41, adapted to be brought into engagement with the slots of the driving elements 19, 19′ respectively. This insertion piece 36 has a conical radially extending recess 42, and the shaft 39 of the coupling lever 40 has a similar recess 38, a locking pin 37 with conical ends being shiftably inserted between the insertion piece 36 and shaft 39. The pin 37 is of such length that when one end thereof is in the recess 38 of the shaft, the opposite end is clear of the recess in the member 36, and vice versa, the conical formation of the said recesses acting on the similarly formed ends of the pin when the shaft 39 is rotated, to cause reciprocatory movement of the pin, the recess 38 being so located that only when the clutch is disengaged can the pin enter said recess. The clutch 18′ is moved into and out of operation by rotation of the shaft 39, said shaft having at its inner end what is known as a "quick thread" 39′ adapted to engage a collar 44 similarly threaded at its interior, and which collar carries the usual bifurcated yoke 45 straddling the clutch 18' for shifting said clutch.

When the clutch is disengaged, in which case the lever 40 is in the position shown in Fig. 3, the locking pin 37 will be pushed into the recess 38 of shaft 39 by the action of the insertion piece 36 when the auxiliary machine, belt pulley or the like, is being put on, and the insertion piece can be put on completely until the tappet 41 engages correctly with the driving element 19 or 19'. When this is the case, the clutch can be engaged by rotating the crank lever 40, the shaft 39 pushing at this occasion the locking pin 37 into the recess 42 of the insertion piece 36 of the auxiliary machine or belt pulley, so that the insertion piece is thus locked and cannot be removed, until the clutch has been disengaged. When, however the clutch is engaged, the pin 37 projects into the path of the insertion piece and prevents the putting on of said insertion piece.

It is evident that, if only one half of the machine is to be used, merely the working points are reduced but not the above mentioned advantages. This form of construction remains, however, within the bounds of the invention.

The machine according to the invention is of very compact construction and possesses, besides good accessibility and a secure housing excluding any danger for the attendant, a many sided possibility of application and permits of carrying out the most different household-kitchen- and confectionery-work in a practical, rapid and comfortable form.

The machine described may serve, for instance in connection with the operating mechanism of the stirrers 15 associated with vessels 21, for preparing dough, for mashing fruit, vegetables and soups, and for making ice cream. The vessels 21 are shown in the drawing provided with suitable mechanism for raising and lowering the same, which mechanism, however, not being an essential part of the present invention, it is deemed unnecessary to describe in detail.

I claim:—

1. A safety mechanism, comprising in combination, a driving shaft, a driving element mounted for rotation in alinement with said driving shaft, cooperating clutch members carried by said driving shaft and driving element, said clutch members being normally disengaged, a bearing member removably supported in alinement with said driving element and carrying an auxiliary shaft, said driving element and auxiliary shaft having cooperating means for connecting them for rotation together, means for bringing the clutch members into operative engagement, and cooperating means carried by said bearing member and clutch operating means automatically operative when the clutch members are in engagement to prevent removal of the bearing member and also operative to prevent insertion of the bearing member while the clutch members are in engagement.

2. A safety mechanism, comprising in combination, a driving shaft, a driving element mounted for rotation in alinement with said driving shaft, a clutch member carried by said driving element, a cooperating clutch member slidable on said driving shaft, said clutch members being normally disengaged, a rotatable clutch-shifting shaft disposed in parallel relation with said driving shaft, gearing between said clutch-shifting shaft and said shiftable clutch member for shifting the same into and out of engagement with its cooperating clutch member, a bearing member removably supported in alinement with said driving element and carrying an auxiliary shaft, said driving element and auxiliary shaft having cooperating means for connecting them for rotation together, and means between said bearing member and clutch-shifting shaft for preventing removal and insertion of the bearing member when the clutch-shifting shaft has been rotated to bring the clutch members into operative engagement.

3. A safety mechanism, comprising in combination, a driving shaft, a driving element mounted for rotation in alinement with said driving shaft, a clutch member carried by said driving element, a cooperating clutch member slidable on said driving shaft, said clutch members being normally disengaged, a rotatable clutch-shifting shaft disposed in parallel relation with said driving shaft, gearing between said clutch-shifting shaft and said shiftable clutch member for shifting the same into and out of engagement with its cooperating clutch member, a bearing member removably supported in alinement with said driving element and carrying an auxiliary shaft, said driving element and auxiliary shaft having cooperating means for connecting them for rotation together, and camming means between the bearing member and clutch-shifting shaft for preventing simultaneous rotation of said members thereby to prevent removal and insertion of the bearing member when the clutch-shifting shaft has been rotated to bring the clutch members into operative engagement.

4. A safety mechanism, comprising in combination, a driving shaft, a driving element mounted for rotation in alinement with said driving shaft, a clutch member carried by said driving element, a cooperating clutch member slidable on said driving shaft, said clutch members being normally disengaged, a rotatable clutch-shifting shaft disposed in parallel relation with said driving shaft, gearing between said clutch-shifting shaft and said shiftable clutch member for shifting the same into and out of engagement with its cooperating clutch member, a bearing member removably supported in alinement with said driving element and carrying an auxiliary shaft, said driving element and auxiliary shaft having cooperating means for connecting them for rotation together, said clutch-shifting shaft and bearing member being each provided with a radially-extending opening, and a slidable pin disposed between said shaft and bearing member and adapted to engage said openings with its opposite ends respectively, the walls of said openings being so formed as to exert a cam action on said pin whereby upon rotation of either of said bearing member or clutch-shifting shaft the end of the pin is moved out of the opening in such rotating member and its opposite end caused to enter the opening in the other member.

In testimony whereof I affix my signature.

ALBERT HOFMANN.